April 8, 1952 — R. N. WALLACE — 2,592,214
PROPELLER AND SPINNER CONSTRUCTION
Filed Nov. 26, 1949

INVENTOR
RUDOLF N. WALLACE
BY Harris G. Luther
ATTORNEY

Patented Apr. 8, 1952

2,592,214

UNITED STATES PATENT OFFICE 2,592,214

PROPELLER AND SPINNER CONSTRUCTION

Rudolf N. Wallace, Glastonbury, Conn., assignor to United Aircraft Corporation, East Hartford, Conn., a corporation of Delaware Application November 26, 1949, Serial No. 129,608

3 Claims. (Cl. 170—160.23)

The invention relates to aircraft propeller installations and more specifically to an improved propeller spinner construction for variable pitch propellers adapted for use with an engine cowling air intake or turbo-prop power plant intakes.

It is an object of this invention to provide a propeller spinner construction for a variable pitch propeller including a fixed propeller blade fairing for maintaining substantially undisturbed air flow over the spinner and into the cowling intake while the propeller blades are in any of their varied pitch positions.

Another object of this invention is to provide a spinner construction of the type described wherein means is also provided for maintaining a substantially sealed relation between the inboard end of the main portion of the blade and the fixed fairing.

Another object of this invention is to provide a spinner construction whereby any disturbing effect caused by the juncture between the spinner and variable pitch propeller blade is removed radially outward away from the region of air flowing directly over the spinner and into the entrance to the engine cowl.

These and other objects of this invention will become apparent from the following detailed description of the accompanying drawing in which, Fig. 1 is a side view of the propeller spinner construction of this invention illustrating the blades in partial section and the spinner partially broken away.

Figure 1:
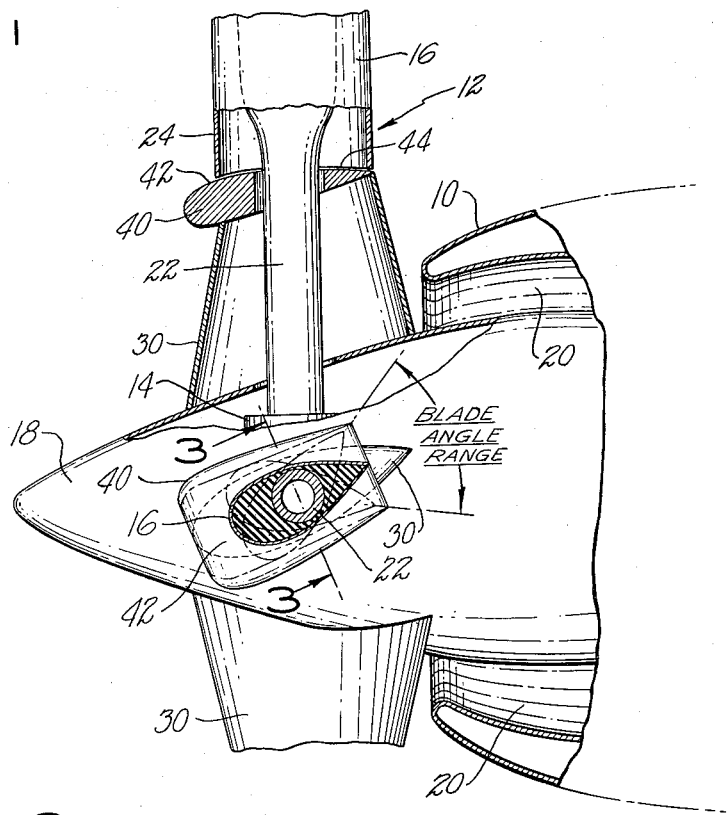
Figure 2:
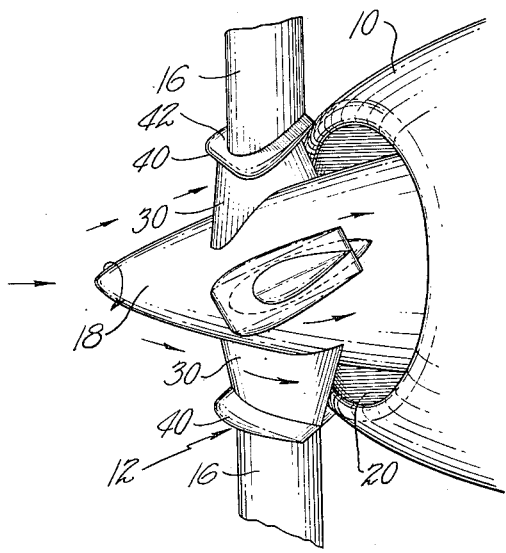
Fig. 2 is a perspective view illustrating the spinner and the position of the fixed fairing members thereon.
Figure 3:
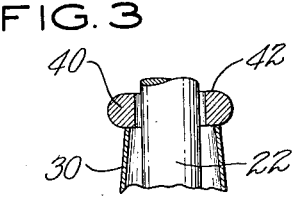
Fig. 3 is a cross-sectional view taken along the line 3—3 of Fig. 1.

Referring to Fig. 1, an engine cowling 10 is shown having a propeller 12 mounted immediately forward thereof which comprises a hub 14 and a plurality of variable pitch blades 16 extending radially from the hub. A propeller spinner 18 surrounds the hub 14 and terminates within the inlet 20 of the cowl 10 to form a streamlined closure for the hub.

Each of the blades 16 include a shank portion 22 and an enlarged main portion 24 of airfoil shape. The main portion 24 may be the outer covering of a hollow propeller blade or it may comprise the cuff of a solid propeller blade. A fairing 30 of airfoil shape surrounds the blade shank 22 and is mounted on the spinner 18 at some predetermined fixed angle of attack relative to the axis of the spinner. The fixed fairing 30 terminates at its outboard extremity in a substantially streamlined plate-like flange 40 whose plane is transverse to the longitudinal axis of the blade. The flanged member 40 is actually a semi-airfoil member but is primarily streamlined to coincide with the alignment of the streamlines flowing over the spinner and around the cowl opening. The flanged member 40 includes an outboard surface 42 in juxtaposed relation with the curved chordwise edge 44 of the inboard end of the blade covering 24. The surface portion 42 on the flange 40 is of spherical shape whereby continued juxtaposed relation is maintained between the edge 44 of the blade cover 24 throughout the range of pitch positions of the propeller blade. As a result of this construction, during pitch change, there will be no spacing or gap between the edge 44 of the blade covering 24 and the surface 42 on the outboard face of the flange 40 thereby minimizing the amount of flow disturbances that would normally occur during such pitch changes.

It should be noted that the parting line between the main blade portion 24 and the flange 40 is positioned sufficiently outboard, that is, radially away from the hub, so that this parting line is outside of the region of air which normally moves into the inlet 20. Thus, regardless of propeller pitch variation, any minor disturbances that may occur will be confined to the region of air flowing outside the cowling radius. Further, the fixed pitch fairing 30 will provide a continuously smooth flow of air to the engine via the inlet 20 throughout the operational range of the power plant.

As a result of this invention, it is apparent that an improved spinner construction is provided for directing undisturbed air flow around the spinner and through propeller blade section and into the cowling inlet 20.

Also, as a result of this improved construction, efficient and maximum flow into the inlet 20 is obtained under varied operating conditions.

Although only one embodiment of this invention has been illustrated, it would be apparent that various changes and modifications may be made in the arrangement and construction of the parts without departing from the scope of this novel concept.

I claim:

1. An aircraft propeller construction comprising a spinner, a variable pitch propeller blade extending radially from the spinner including a shank portion and an enlarged main portion of airfoil shape, said main portion terminating at its inboard extremity in a substantially curved chordwise edge, an elongated fairing of airfoil shape surrounding said shank and fixed to said spinner at a predetermined angle of attack, said fairing terminating at its outboard extremity in a surface running substantially transversely to the longitudinal axis of said blade, said surface having an area greater than the cross-sectional area of said fairing, and means forming a part of said surface for providing continuous juxtaposed relation between said edge and said surface in the varied pitch positions of said blade including a substantially spherical surface portion disposed adjacent said edge.

2. In a propeller construction comprising a spinner and a variable pitch blade extending radially therefrom, said propeller comprising a shank and a relatively enlarged main portion of airfoil shape having a curved inboard terminus along its chordwise dimension, the combination of a fixed cowl forming an air inlet downstream of said propeller which receives the trailing portion of said spinner, and means for maintaining substantially smooth and undisturbed flow in said inlet in the varied pitch positions of said blade comprising, a cuff of airfoil shape fixed to said spinner and surrounding said shank, said cuff terminating at its outboard end in a streamlined surface disposed substantially transversely to the longitudinal axis of said shank, said streamlined surface being located at a distance from the propeller axis of rotation at least equal to the outer radial dimension of said air entrance, and sealing means forming a part of said surface including a substantially spherical portion in continuous juxtaposed relation with said curved inboard terminus in the varied pitch positions of said blade.

3. An aircraft propeller construction comprising a spinner, in combination with, an engine cowl opening aft of the propeller, a variable pitch propeller blade extending radially from the spinner including a shank portion and an enlarged main portion of airfoil shape, said main portion terminating at its inboard extremity in a substantially curved chordwise edge, an elongated fairing of airfoil shape surrounding said shank and carried by said spinner at a fixed angle of attack relative to the airstream, said fairing providing substantially undisturbed air flow over said spinner and into said cowl opening and including a plate-like outboard terminus adjacent said edge, said plate-like terminus being positioned in a plane substantially transversely to the longitudinal axis of said blade, and means providing continued juxtaposed relation between said edge and plate-like terminus including a substantially spherical surface on the outboard face of said terminus.

RUDOLF N. WALLACE.

REFERENCES CITED

The following references are of record in the file of this patent:

UNITED STATES PATENTS

| Number | Name | Date |
|---|---|---|
| 2,068,617 | Wilford et al. | Jan. 19, 1937 |
| 2,125,187 | Lansing | July 26, 1938 |
| 2,408,677 | Owner | Oct. 1, 1946 |
| 2,471,895 | Radtke | May 31, 1949 |
| 2,522,083 | Avondoglio | Sept. 12, 1950 |

FOREIGN PATENTS

| Number | Country | Date |
|---|---|---|
| 882,069 | France | Feb. 15, 1943 |